United States Patent
Muennich et al.

(10) Patent No.: US 9,567,937 B2
(45) Date of Patent: Feb. 14, 2017

(54) METHOD AND DEVICE FOR OPERATING A FUEL INJECTION DEVICE, ESPECIALLY OF A MOTOR VEHICLE

(71) Applicant: Robert Bosch GmbH, Stuttgart (DE)

(72) Inventors: Christian Alexander Muennich, Reutlingen (DE); Johannes Zeidler, Backnang (DE); Till Wokoeck, Reutlingen (DE); Thomas Becker, Esslingen/Zell (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/765,522

(22) PCT Filed: Jan. 14, 2014

(86) PCT No.: PCT/EP2014/050529
§ 371 (c)(1),
(2) Date: Aug. 3, 2015

(87) PCT Pub. No.: WO2014/121980
PCT Pub. Date: Aug. 14, 2014

(65) Prior Publication Data
US 2016/0003184 A1    Jan. 7, 2016

(30) Foreign Application Priority Data

Feb. 7, 2013 (DE) .......... 10 2013 201 997

(51) Int. Cl.
*F02M 59/00* (2006.01)
*F02D 41/38* (2006.01)
(Continued)

(52) U.S. Cl.
CPC ....... *F02D 41/3863* (2013.01); *F02D 19/0623* (2013.01); *F02D 41/0025* (2013.01);
(Continued)

(58) Field of Classification Search
CPC  F02D 41/403; F02D 41/2096; F02D 41/3094; F02M 45/10; F02M 51/06; F02M 43/00
(Continued)

(56) References Cited

U.S. PATENT DOCUMENTS

| 7,073,487 B1 * | 7/2006 | Oono ................. F02D 41/3845 123/456 |
| 2005/0092301 A1 * | 5/2005 | Fukuda ............... F02M 59/366 123/446 |

(Continued)

FOREIGN PATENT DOCUMENTS

| DE | 196 25 487 | 1/1998 |
| DE | 10 2012 101234 | 8/2012 |
| EP | 0 860 601 | 8/1998 |

OTHER PUBLICATIONS

International Search Report for PCT/EP2014/050529, dated Jan. 21, 2014.

*Primary Examiner* — Davis Hwu
(74) *Attorney, Agent, or Firm* — Norton Rose Fulbright US LLP; Gerard Messina

(57) ABSTRACT

In a method for operating a fuel injection device of a motor vehicle, fuel is conveyed under high pressure into a high-pressure reservoir, the pressure of which is controlled with the aid of a pressure regulation and from which fuel is taken for injection via at least one fuel injection valve under the control of a control device. A control pressure deviation of the pressure in the high-pressure reservoir is detected and the existence of a balance disturbance between quantity of fuel supplied to the high-pressure reservoir and quantity of fuel taken from the high-pressure reservoir is deduced from the control pressure deviation. If a balance disturbance exists, operational influencing of the fuel injection device (Continued)

counteracting the balance disturbance is produced and/or a corresponding report is generated.

18 Claims, 4 Drawing Sheets

(51) Int. Cl.
 *F02D 19/06* (2006.01)
 *F02D 41/00* (2006.01)
 F02D 41/22 (2006.01)
(52) U.S. Cl.
 CPC .... *F02D 41/3836* (2013.01); *F02D 2041/224* (2013.01); *F02D 2041/227* (2013.01); *F02D 2041/228* (2013.01); *F02D 2250/26* (2013.01); *Y02T 10/36* (2013.01)
(58) Field of Classification Search
 USPC ..... 239/585.1, 585.3, 585.4, 585.5, 8, 533.2
 See application file for complete search history.

(56) References Cited

U.S. PATENT DOCUMENTS

| | | | |
|---|---|---|---|
| 2007/0079809 A1* | 4/2007 | Oono | F02D 41/3845 123/456 |
| 2009/0143958 A1 | 6/2009 | Parker et al. | |
| 2010/0010726 A1 | 1/2010 | Orikabe | |
| 2011/0079199 A1* | 4/2011 | Marzahn | F02D 41/2096 123/478 |

* cited by examiner

METHOD AND DEVICE FOR OPERATING A FUEL INJECTION DEVICE, ESPECIALLY OF A MOTOR VEHICLE

BACKGROUND OF THE INVENTION

1. Field of the Invention

The present invention relates to a method and a device for operating a fuel injection device of a motor vehicle, and a computer program that executes all steps of the method according to the present invention.

2. Description of the Related Art

A fuel injection device is known from published German Patent Application document DE 196 25 487 A1. In the case of that device, fuel is conveyed under high pressure into a high-pressure reservoir (in the case of a self-ignition internal combustion engine the so-called "common rail") the pressure of which is controlled by a pressure regulator disposed in a control unit or by a corresponding pressure control valve and from which fuel is taken for injection via electrically controlled injection valves.

In operation of such an injection device, it may happen that owing to a malfunction the quantity (or mass) of fuel actually supplied to the high-pressure reservoir is not equal to the quantity envisaged for fuel injection and required for the pressure regulation. It is therefore known to carry out, at least occasionally, an examination of the fuel quantity balance in the high-pressure reservoir.

To prevent an inadequate fuel quantity balance, configuration of the injection device is effected with regard to the mentioned balance of incoming and outgoing quantities (masses) of fuel in the mentioned high-pressure reservoir, this being done in a manner known per se subject to estimated or empirically obtained properties of components of the injection device that determine the fuel flow, and in the worst case with a total failure of one or more of those components.

Alternatively or in addition, the mentioned configuration of the injection device is effected assuming a given standard fuel. Since the quality of the fuel, and in the present case especially the viscosity of the fuel, may be subject to fluctuations in various markets or regions, so that by way of example only a fuel having, for example, a relatively low viscosity is offered for sale, the configuration must also take those possible fluctuations into account.

In driving operation of a motor vehicle having such an internal combustion engine, the situation may therefore arise that properties or modes of behavior predicted for mentioned components are not maintained and, as a result, the mentioned balance of quantities of fuel flowing into and out of the mentioned high-pressure reservoir is no longer ensured.

In both of the mentioned cases of varying component properties and/or varying fuel quality or viscosity, the balance of the incoming and outgoing flows in the high-pressure reservoir would be disturbed in the mentioned situations and therefore the fuel pressure in the high-pressure reservoir would continuously or successively fall. As a countermeasure, the mentioned pressure regulator would increase the incoming flow into the high-pressure reservoir until a predefined control limit of the regulator, that is, the maximum possible incoming quantity in the case of the above-mentioned configuration, were reached. If the fuel pressure were then to fall further or if the fuel pressure were not to recover again from too low a level, the internal combustion engine would have to be shut down on the assumption that there was an external leak.

BRIEF SUMMARY OF THE INVENTION

The present invention is based on the concept of recognizing a described balance disturbance and of counteracting a recognized disturbance by suitable intervention in the injection system or the internal combustion engine. In particular, this makes use of the fact that the injection quantity required in operation of the internal combustion engine causes fuel to flow out of the high-pressure reservoir, allowing the value of the injection quantity to be calculated from the requested torque (=desired torque) and/or the temperature behavior of the internal combustion engine. By influencing the required injection quantity it is accordingly possible to compensate for or counteract a mentioned balance disturbance.

The recognition of a mentioned balance disturbance is effected according to the invention by detecting a control pressure deviation of the pressure in the high-pressure reservoir, the existence of a balance disturbance between quantity of fuel supplied to the high-pressure reservoir and quantity of fuel taken from the high-pressure reservoir being deduced from the detected control pressure deviation. The recognition of a balance disturbance is accordingly effected on the basis of easily generated or already existing data and may therefore be implemented at relatively little expense and with relatively little technical complexity.

With the present invention, switching-off of the internal combustion engine or of a motor vehicle having the internal combustion engine may be prevented by re-establishing the necessary balance of the incoming and outgoing quantities of fuel by a reduction of the desired torque, that is, by a corresponding desired-quantity correction of the injection system.

The mentioned reduction of the desired torque may be effected by at least temporarily specifying an appropriately reduced maximum desired torque.

It may further be provided that the mentioned desired-quantity correction is used only when a disturbance of the mentioned balance has also actually been detected or proven. At the same time, it may additionally be examined whether a proven balance disturbance is also permanent or only temporary, since any regulating operation is associated with transient settling effects and hence with brief balance disturbances which according to the invention are to be given no consideration in the recognition of a balance disturbance.

It may further be provided that the mentioned desired-quantity correction is carried out only to the extent that operation of the internal combustion engine in accordance with regulations or the driving operation in accordance with regulations of a motor vehicle equipped with an internal combustion engine continues to be possible with minimum impairment. That may be effected, for example, by specifying the mentioned maximum value of the desired torque to be so great that the internal combustion engine may be operated with values of the desired torque that ensure adequate operating convenience of the internal combustion engine or adequate driving convenience of the motor vehicle.

It is possible to ensure at the same time that the mentioned interventions in the desired-quantity correction also meet the strict specifications of what is referred to as the "Drive-By-Wire Working Group". Those specifications relate to an already standardized safety concept for engine controllers of gasoline and diesel engines which also satisfies the very strict safety requirements of the ASIL classification (ASIL=Automotive Safety Integrity Level, a safety integrity level specified in the ISO 26262 Standard for safety-related systems in motor vehicles).

To improve the recognition quality of a balance disturbance, the detected control pressure deviation may be compared with a threshold value, the existence of a balance disturbance being deduced only if the threshold value is exceeded. In addition, it may be provided that the comparison of the control pressure deviation with the threshold value takes place within a predefined time window. The recognition on the basis of the threshold value in combination with the time window has the advantage that only control pressure deviations that occur permanently are taken into consideration.

As the operational influencing of the fuel injection device, which influencing counteracts the balance disturbance, a limit torque may be ascertained. It may be provided in that case that a counter is incremented, the effect of which counter on a characteristic diagram of the injection system produces a revolution-speed-dependent torque limitation. It may further be provided that the limit torque is tracked with the aid of a ramp function starting from a current value of the limit torque and that the slope of the ramp function is adapted to an actual value of the high-pressure reservoir. Those measures individually or in combination have the advantage that in the case of a critically rapidly falling actual pressure, the limit torque is continuously adapted or tracked by a very rapid torque tracking operation, following the current actual pressure.

The suitable magnitude of the limit torque may also be ascertained with the aid of an integral controller to the input of which is connected a control deviation supplied by the mentioned pressure regulation. In that case, the control deviation may previously be filtered and/or debounced and/or examined for permanence. The output signal of the integral controller may be supplied to an actuator of the injection system, which actuator reduces the limit torque. The integral controller integrates the existing values of the control deviation and generates an output signal that constantly rises with time, which has the advantage that, in the case of rapidly falling pressure, a correspondingly rapid tracking of the limit torque also takes place.

As an alternative or additional intervention in the maximum torque made available by the internal combustion engine, a switching-off of individual or multiple injections not required for the torque currently requested on the part of the driver, especially non-required pre- and/or post-injections, may be carried out.

Especially in the case of injection systems having servo-injectors, as an alternative thereto a reduction or saving in fuel taken from the high-pressure reservoir may be made by reconfiguring individual or multiple injections relative to one another.

It should be noted that the described possible interventions in the torque are not in principle dependent on the type of injector and therefore may be used in injection systems with any kind of injector. In particular, the mentioned injection systems having servo-injectors are understood as being merely an exemplary embodiment and to that extent do not constitute any limitation.

The recognition quality of a balance disturbance may be still further improved by subjecting the desired-quantity correction according to the invention to a learning process. The learning process is able to categorize the operating point of the internal combustion engine of the motor vehicle with regard to the tendency to exhibit a balance disturbance at all, with regard to the probability of the occurrence of such a disturbance in the region of the control limit of the pressure regulator and/or with regard to the permanence of the disturbance. That categorization may take place in the course of a preliminary examination, whereby it is possible to minimize false reports of a balance disturbance. The mentioned threshold value and/or the mentioned time window may also be optimized stepwise in the course of a learning process.

The method proposed according to the invention and the device thus make it possible to remedy a high-pressure fuel reservoir quantity balance that may have been violated in driving operation and thus enable the internal combustion engine or a motor vehicle having the internal combustion engine to continue operating.

The present invention may be used both in internal combustion engines of motor vehicles and in industrial facilities, for example in the case of internal combustion engines employed in industrial process engineering, with the advantages described herein.

Further advantages and embodiments of the present invention will be apparent from the description and the accompanying drawings.

It will be appreciated that the features mentioned in the foregoing and the features yet to be explained hereinafter may be used not only in the particular combination indicated but also in other combinations or individually, without departing from the scope of the present invention.

DETAILED DESCRIPTION OF THE INVENTION

Figure 1:
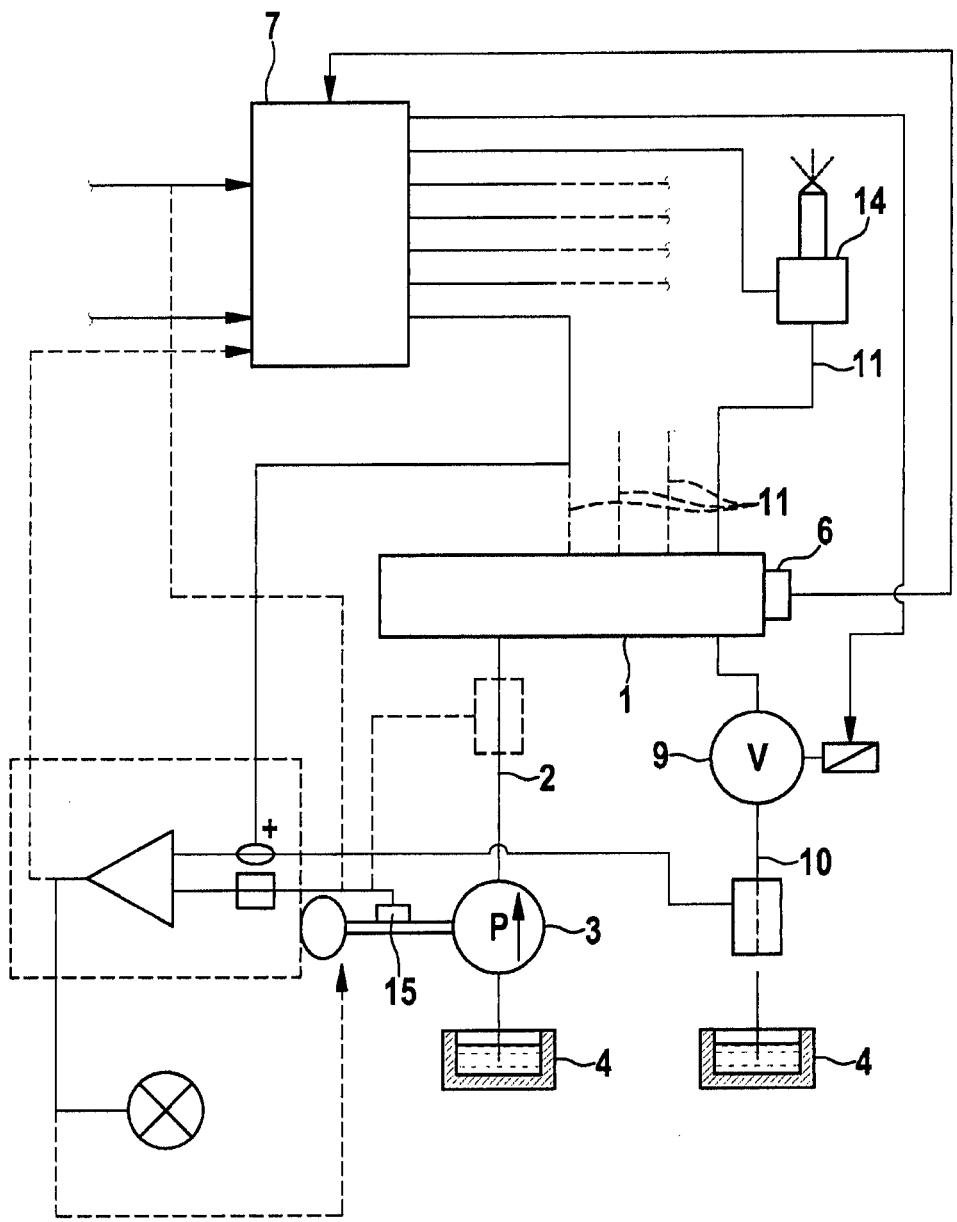
FIG. 1 shows a fuel injection device according to the related art.

FIG. 1 shows a high-pressure fuel reservoir 1 which, via a feed line 2 from a fuel pump 3 which sucks fuel out of a fuel vessel 4, is supplied with fuel that has been brought to a high injection pressure. In this case, pressures substantially above 1000 bar occur. The pressure in the high-pressure fuel reservoir is detected by a pressure transducer 6 the signal of which is supplied to a control device 7 with which a pressure control valve 9 is actuated by a corresponding signal when a fixed pressure or a desired pressure, which may be dependent on a respective operating state of the associated internal combustion engine, is exceeded. Pressure control valve 9 is situated in a fuel return line 10 from high-pressure fuel reservoir 1 to fuel vessel 4.

Also leading from high-pressure fuel reservoir 1 are pressure lines 11 which are each connected to a fuel injection valve 14 via which a desired quantity of fuel in each case may be injected into the internal combustion engine at the appropriate time. Control of the fuel injection quantity according to time and quantity is also effected by way of control device 7 which for the purpose of that control receives control signals corresponding to engine speed and load under which the associated internal combustion engine is to be operated. The control of that fuel injection quantity is effected, for example, in known manner by solenoid valves which control the connection between the high-pressure reservoir and the fuel injection valve. Any control quantities of fuel that occur in the process and that flow back into the tank may also be conveyed back into the tank via return line 10.

Fuel pump 3 is driven, for example, synchronously with the internal combustion engine operated by the fuel injection device, that is, at a revolution engine speed that is also already being detected for controlling the injection. Fuel pump 3 may, however, also be operated separately by a special drive and, in that case, the relevant driving revolution speed of fuel pump 3 may also be detected, for example by a revolution speed transducer 15. With the aid of that driving revolution speed and the fact that fuel pump 3 delivers a constant delivery quantity per revolution it is possible for the quantity of fuel supplied in the high-pressure fuel reservoir to be detected indirectly, and therefore it is possible to dispense with a flow rate measuring device for direct measurement of the fuel quantity delivered.

The method described hereinafter and shown in FIG. 2, which is preferably an adaptive method, makes possible very accurate detection of a disturbed balance of quantities or masses of fuel flowing into and out of a high-pressure reservoir in question here. In the exemplary embodiment under consideration, the method comprises three sections 200-210. In first section 200, a preliminary examination is carried out. Only when one or more of the conditions examined therein are met does the actual recognition of an actual balance disturbance take place in section 205. Finally, in section 210, measures for possible elimination of a recognized balance disturbance take place.

After start 215 of the routine shown, it is examined with the aid of the mentioned preliminary examination (or plausibility test) whether a mentioned balance disturbance could in principle exist at all. In the preliminary examination, first a relatively rough comparison 220 of the mentioned incoming and outgoing fuel flows takes place. If the result of that comparison is negative, a jump back to the start of the routine takes place. In the case of a recognized possible balance disturbance, what is referred to as an operating point of the injection system or internal combustion engine with regard to quantity balance is determined 225, and that is preferably done on the basis of the following conditions a)-c):

a) equipment- and system-related tendency of the specific injection system in question toward the mentioned balance disturbances. That tendency may be ascertained beforehand on the basis of a series of injection systems, in which case it is to be expected, for example, that the tendency is, in particular, also dependent on batch and on serial number. Alternatively, the tendency may be determined on the basis of certain installed components such as injection valves, pumps or the like.

b) possible disturbance is in the region of the control limit of the controller and is therefore excluded from a remedy as a matter of principle.

c) possible disturbance occurs on a permanent basis or only temporarily. Only in the case of a permanent disturbance is it at all possible to proceed on the assumption that a balance disturbance exists.

On the basis of whether those conditions are met or not met, the range of action of the proposed method may be restricted in such a way that potential false reports of disturbances are minimized or prevented.

Figure 2:
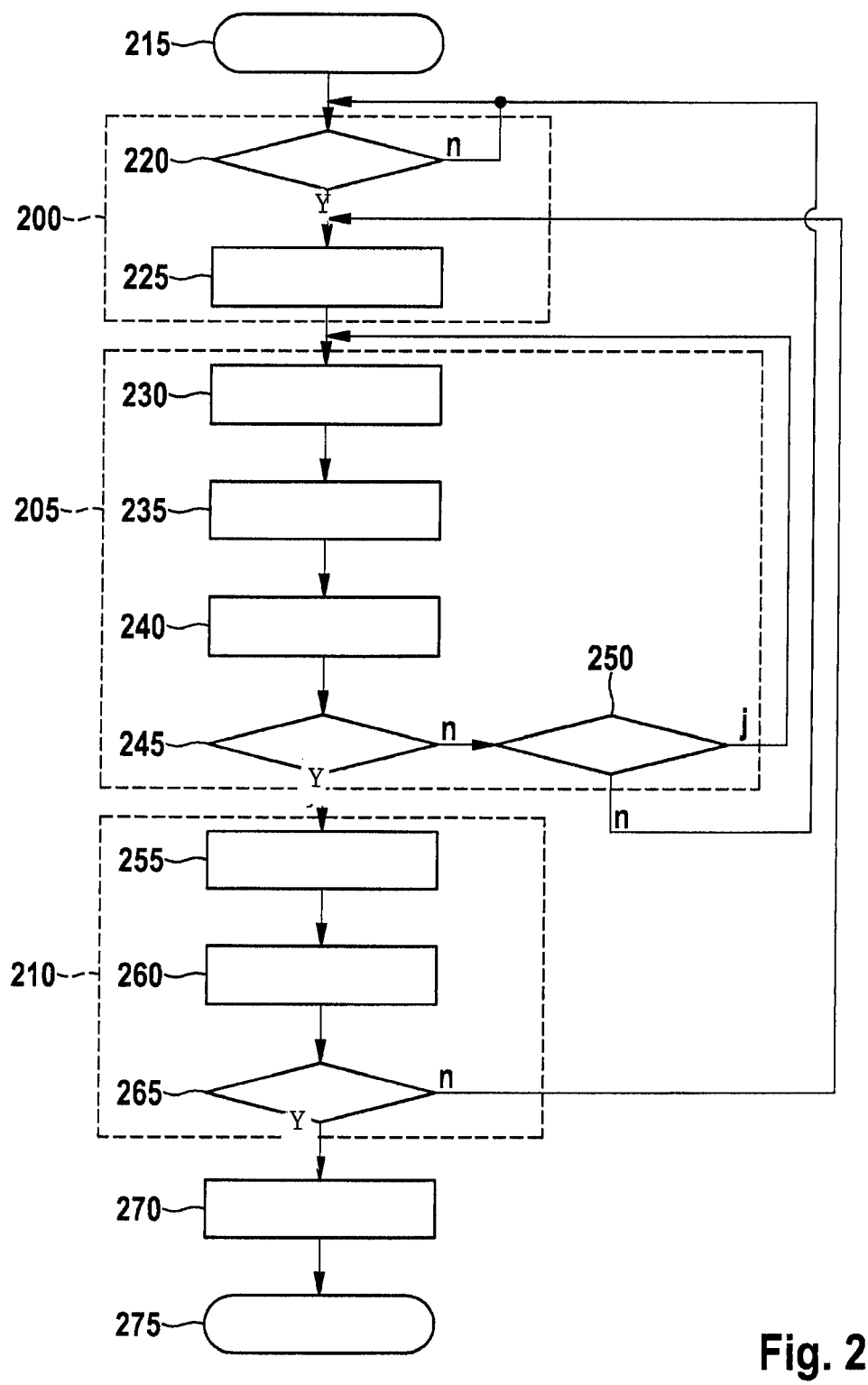
FIG. 2 shows a preferred embodiment of the method according to the invention with the aid of a flow diagram.

The actual recognition of an actually existing balance disturbance, which is carried out in section 205, is effected, as may be seen in FIG. 2, on the basis of the pressure regulation of a high-pressure fuel reservoir of an internal combustion engine, for example a rail pressure regulation in the case of a self-ignition internal combustion engine. In that case, rail pressure values supplied by a pressure sensor are detected 230 at preferably regular intervals of, for example $\frac{1}{10}$ s, and the control deviation from a predefined desired value in each case is ascertained 235 with the aid of a pressure regulator. The detected values of the control deviation are, in addition, debounced 240 in the exemplary embodiment in order to prevent brief pressure fluctuations caused, for example, by settling effects in the high-pressure reservoir from being wrongly recognized as a balance disturbance.

Values of the control pressure deviation that have been detected and debounced within an empirically established time window $\Delta t_E$ are compared 245 with a predefined threshold value $\Delta p_{thres}$. The use of time window $\Delta t_E$ substantially serves to take into consideration the mentioned permanence of the detected events. If the threshold value is not exceeded, then in the next step 250 it is examined whether time window $\Delta t_E$ has not yet been exceeded, that is, whether the condition $t \leq \Delta t_E$ has been met or not. If the condition has been met, a further value of the control deviation is detected and is evaluated as described above. If the time window has already been exceeded, a jump back to the start of the routine takes place. If the threshold value is exceeded within time window $\Delta t_E$, the existence of an actual balance disturbance is assumed and the procedure continues in step 210.

In the course of the mentioned learning process, the above-mentioned steps are carried out recursively, for example on a test bench of the injection system, and the mentioned predefined values of the threshold value, the debouncing time and of the time window $\Delta t_E$ are calibrated or optimized stepwise from measuring cycle to measuring cycle. The data obtained in so doing may, where appropriate, be stored in a characteristic diagram, especially as a function of the revolution speed of the internal combustion engine, so that they may be accessed in the actual recognition operation. It is worth mentioning here that the threshold value and the debouncing time are functions of the revolution speed of the internal combustion engine since the incoming flow, which is decisively determined by the pump output, and the desired quantity (that is, the outgoing flow) are functions of the revolution speed.

In the case of a recognized actual balance disturbance, steps 255 etc. are carried out in the exemplary embodiment under consideration here. In that case, an intervention in the operating parameters of the injection device or internal combustion engine, which intervention counteracts the balance disturbance, is carried out 255, for example by a control unit of the injection system or internal combustion engine. In the exemplary embodiment under consideration here, the intervention consists of a limitation of the torque (so-called "limit torque") available for the operation of an internal combustion engine or for the driving operation of a motor vehicle having such an internal combustion engine. In addition, the driver of the vehicle in the exemplary embodiment is informed 260 accordingly via a display on the instrument panel, for example by a report such as, for example, "engine in emergency running mode—find nearest workshop!"

Figure 4:
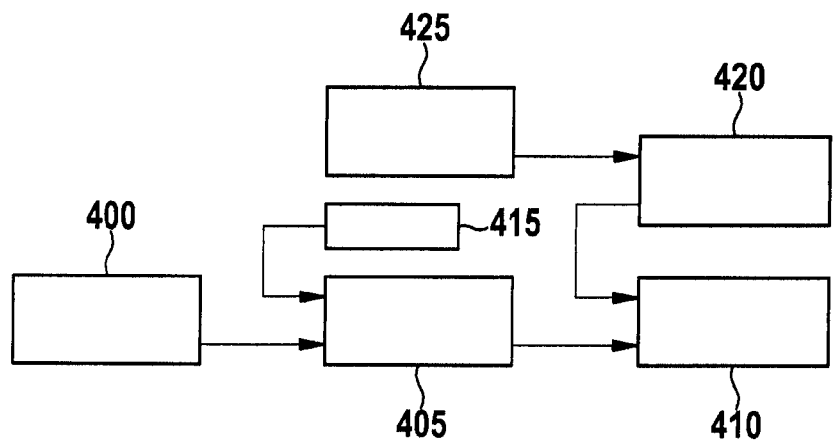
FIG. 4 shows an exemplary embodiment of the method according to the invention, in which a limit torque is ascertained with the aid of a characteristic diagram.

The suitable magnitude of the limit torque is determined, in accordance with a first exemplary embodiment illustrated schematically in FIG. 4, by incrementing a counter 400 the effect of which on a characteristic diagram 405 known per se of the injection system produces a revolution-speed-dependent 415 torque limitation 410. With the aid of a ramp function 420, the limit torque is tracked starting from a current value of the limit torque.

In the exemplary embodiment under consideration shown in FIG. 4, the slope of ramp function 420 is adapted to the debounced actual value of rail pressure 425 or of the correspondingly falling pressure gradient. That has the advantage that, in the case of a critically rapidly falling actual pressure, the limit torque is continuously adapted or tracked by a very rapid torque tracking operation, following the current actual pressure.

Figure 5:
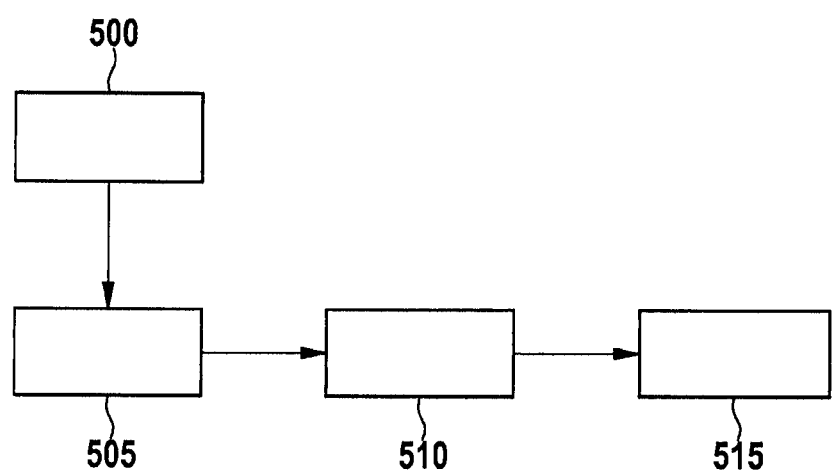
FIG. 5 shows an exemplary embodiment of the method according to the invention, in which the determination of the limit torque is carried out with the aid of an I-controller.

In the case of the exemplary embodiment shown in FIG. 5, the determination of the limit torque is effected with the aid of an integral controller ("I-controller") 510. A (positive) control deviation supplied by a rail pressure controller 500 is filtered, debounced and examined for the mentioned permanence in an arithmetic unit 505, which may be implemented in a control unit of the injection system or as an additional calculation module. The permanent control pressure deviation obtained in so doing is connected to the actual-value input of I-controller 510 for the control variable. I-controller 510 integrates the quantity balance violation manifested in the control deviation and generates an output signal that constantly rises with the time of the application of the control deviation. That output signal is supplied to an actuator 515 of the injection system, which actuator 515 reduces the limit torque with the aid of a corresponding injection signal. That reduction of the limit torque is performed until the permanent control deviation disappears and the remedy described below begins.

It should be noted that, when pre-setting or parameterizing the control parameters of the integral component, they are preferably to be coupled to the magnitude of the actual rail pressure gradient which is negative in the event of disturbance. That ensures that, in the case of a rapidly falling actual pressure, a correspondingly rapid tracking of the limit torque also takes place.

As an alternative or in addition to the two measures described with reference to FIGS. 4 and 5, that is, a respective intervention in the maximum torque made available by the internal combustion engine, it is also possible to carry out a switching-off of individual or multiple non-required injections, especially non-required pre- and/or post-injections. Especially in the case of injection systems having servo-injectors it is possible, as an alternative thereto, for a reduction or saving in fuel taken from the high-pressure reservoir to be made by reconfiguring individual or multiple injections relative to one another—preferably with the overall quantity of fuel consumed being the same.

Following the implementation of a described measure reducing the outgoing flow, it is examined 265 whether that measure was successful and has caused an increase in torque or not.

If the measure was successful, the described torque limitation is frozen 270 at least temporarily or the described switching-off of individual or multiple injections is cancelled again and the routine is ended 275. The currently existing count of the counter remains, however, at the highest value reached. The torque limitation is thus frozen at least for a time. Only by the process described herein of curing an injection device in question here of a permanent disturbance is the counter 400 returned, preferably stepwise, to the value 0 again. In the case of the described use of an I-controller (FIG. 5), the mentioned controller input is switched over to a negative, and hence remedial, requirement, for example by way of an inversion of the input signal.

If the measure was not successful, however, that is, it did not result in a torque increase, on reaching a predefined maximum value of the count and/or on reaching the maximum possible number of omitted injections, a jump back to step 225 takes place and it is again examined whether a permanent control deviation (still) exists or not.

If a permanent control deviation still exists, in the exemplary embodiment under consideration the routine is ended by completely switching off the internal combustion engine. Alternatively, it is also possible for the internal combustion engine to be put into a special emergency running mode in which only a predefined relatively low torque, with distinct losses in operating comfort of the internal combustion engine, may be called up, which at least ensures that the control deviation is reduced. Alternatively or in addition, a report may be sent to the driver of the vehicle or operator of the internal combustion engine, stating that the internal combustion engine is currently being operated in the mentioned emergency running mode.

It should be noted that the mentioned report to the driver of the vehicle may also contain the instruction to ease back on or release the accelerator pedal of the motor vehicle, since that measure would also relieve the burden on the quantity of fuel flowing out of the high-pressure reservoir and hence the permanent control deviation would no longer occur. If, however, the torque limitation were to follow such a relieving or reduction of the outflowing quantity directly, easing back on the accelerator pedal would not result in an immediate reducing effect of the torque. Rather, it is even possible for acceleration of the vehicle to occur.

The latter mode of behavior of the motor vehicle is contrary to the above-mentioned Drive-By-Wire guidelines and may be prevented either by observing the environment of the torque limitation more closely to ensure that the limitation is switched off only when it is certain that it no longer has an effect or alternatively by the torque limitation being, for example, cancelled again and thereby "remedied" by a transition from one driving cycle to the next as described previously.

In the case of the described use of an I-controller (FIG. 5), if a violated quantity balance does not exist the remedy may be effected by specifying an additional artificial negative control difference. By specifying a small deviation and by suitably applied control parameters it is possible to prevent an abrupt freeing of the torque after leaving an operating point of the injection device or internal combustion engine that violates the quantity balance.

In addition, the intervention of the controller (by way of its output signal), which may have a disturbing effect during the remedy phase, may be prevented by a revolution-speed-dependent characteristic curve. In that manner it is also possible, in particular, to prevent conflicts with other functions that intervene in the torque.

Figure 3:
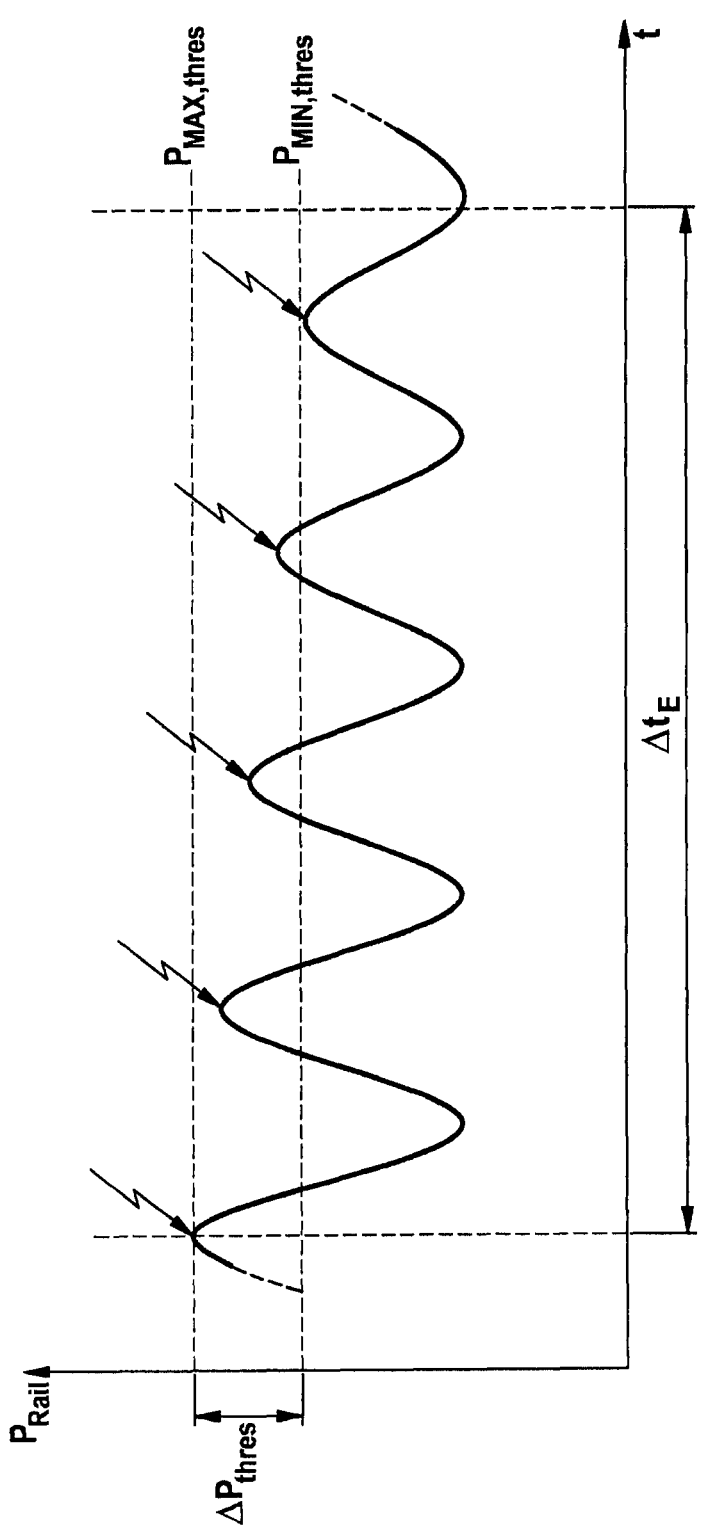
FIG. 3 illustrates the method according to the invention with the aid of an example of a rail pressure curve obtained in the case of a balance disturbance.

In FIG. 3, the pressure $p_{Rail}$ in the common rail of a self-ignition internal combustion engine is plotted over time t. Arrows mark the beginning of the individual injections. With each injection, the pressure $p_{Rail}$ in the rail falls and no longer rises to its original value in the example under consideration owing to a mentioned quantity balance deviation or balance disturbance. It is to be noted that only in the steady state and when a balance disturbance does not exist does the pressure always reach the same value between two injections with the crankshaft in the same position.

The mentioned threshold value $\Delta p_{thres}$ corresponds in the example under consideration to the difference ($p_{MAX,\ thres} - p_{MIN,\ thres}$). The current control deviation per period corresponds to the deviation or difference between the highest value of the pressure curve $p_{Rail}(t)$ reached in the respective period and the upper value $p_{MAX,\ thres}$.

In the mentioned time window $\Delta t_E$, in the example under consideration the highest value reached in each injection period after the injection operation falls stepwise and no longer reaches the upper start value $p_{MAX,\ thres}$. Within time window $\Delta t_E$, the total control pressure deviation resulting from the four periods under consideration (which are merely by way of example) exceeds the threshold value $\Delta p_{thres}$. Thus, in the present case, the above-mentioned condition for an actual balance disturbance is met and it is concluded that such a disturbance exists.

What is claimed is:

1. A method for operating a fuel injection device of an internal combustion engine of a motor vehicle, comprising:
   conveying fuel under pressure into a high-pressure reservoir;
   controlling the pressure in the high-pressure reservoir with the aid of a pressure regulation; and
   supplying fuel from the high-pressure reservoir for injection via at least one fuel injection valve under the control of a control device;
   wherein a control pressure deviation of the pressure in the high-pressure reservoir is detected and the existence of a balance disturbance between quantity of fuel supplied to the high-pressure reservoir and quantity of fuel taken from the high-pressure reservoir is determined from the control pressure deviation, and, if a balance disturbance exists, at least one of (i) an operational influencing of the fuel injection device, which influencing counteracts the balance disturbance, is provided, and (ii) a report of the balance disturbance is generated, wherein:
      the operational influencing is effected with the aid of a desired-quantity correction of the injection system, and
      the desired-quantity correction is a reduction of the desired torque.

2. The method as recited in claim 1, wherein the desired-quantity correction is carried out only if the balance disturbance is recognized as a permanent disturbance.

3. The method as recited in claim 1, wherein the control pressure deviation is compared with a threshold value, and the existence of a balance disturbance is determined only if the threshold value is exceeded.

4. The method as recited in claim 3, wherein the comparison of the control pressure deviation with the threshold value is carried out within a predefined time window.

5. The method as recited in claim 4, wherein at least one of the threshold value and the time window are optimized with the aid of a learning process.

6. A method for operating a fuel injection device of an internal combustion engine of a motor vehicle, comprising:
   conveying fuel under pressure into a high-pressure reservoir;
   controlling the pressure in the high-pressure reservoir with the aid of a pressure regulation; and
   supplying fuel from the high-pressure reservoir for injection via at least one fuel injection valve under the control of a control device;
   wherein a control pressure deviation of the pressure in the high-pressure reservoir is detected and the existence of a balance disturbance between quantity of fuel supplied to the high-pressure reservoir and quantity of fuel taken from the high-pressure reservoir is determined from the control pressure deviation, and, if a balance disturbance exists, at least one of (i) an operational influencing of the fuel injection device, which influencing counteracts the balance disturbance, is provided, and (ii) a report of the balance disturbance is generated, wherein a limit torque is ascertained and utilized for the operational influencing of the fuel injection device, which influencing counteracts the balance disturbance.

7. The method as recited in claim 6, wherein the limit torque is ascertained by incrementing a counter, the effect of which incrementing on a characteristic diagram of the injection system produces a revolution-speed-dependent torque limitation.

8. The method as recited in claim 7, wherein the limit torque is tracked with the aid of a ramp function starting from a current value of the limit torque.

9. The method as recited in claim 8, wherein the slope of the ramp function is adapted to an actual value of the high-pressure reservoir.

10. The method as recited in claim 6, wherein the limit torque is ascertained with the aid of an integral controller, the input of which is supplied with the control pressure deviation from the pressure regulation.

11. The method as recited in claim 10, wherein the control pressure deviation is at least one of (i) filtered, (ii) debounced, and (iii) examined for permanence.

12. The method as recited in claim 11, wherein the output signal of the integral controller is supplied to an actuator of the injection system, which actuator reduces the limit torque.

13. The method as recited in claim 1, wherein the operational influencing of the fuel injection device, which influencing counteracts the balance disturbance, is a switching-off of at least one injection not required for the currently requested torque.

14. The method as recited claim 13, wherein a switching-off of at least one of a pre-injection and a post-injection not required for the currently requested torque is carried out.

15. The method as recited in claim 14, wherein at least two injections are reconfigured relative to one another.

16. The method as recited in claim 1, wherein, in addition, a preliminary examination is carried out to ascertain a tendency of the fuel injection device toward a balance disturbance.

17. A non-transitory, computer-readable data storage medium storing a computer program having program codes which, when executed on a computer, perform a method for operating a fuel injection device of an internal combustion engine of a motor vehicle, the method comprising:
   conveying fuel under pressure into a high-pressure reservoir;
   controlling the pressure in the high-pressure reservoir with the aid of a pressure regulation; and
   supplying fuel from the high-pressure reservoir for injection via at least one fuel injection valve under the control of a control device;
   wherein a control pressure deviation of the pressure in the high-pressure reservoir is detected and the existence of a balance disturbance between quantity of fuel supplied to the high-pressure reservoir and quantity of fuel taken from the high-pressure reservoir is determined from the control pressure deviation, and, if a balance disturbance exists, at least one of (i) an operational influencing of the fuel injection device, which influencing counteracts the balance disturbance, is provided, and (ii) a report of the balance disturbance is generated, wherein:
  the operational influencing is effected with the aid of a desired-quantity correction of the injection system, and
  the desired-quantity correction is a reduction of the desired torque.

18. A control system for a fuel injection device of an internal combustion engine, comprising:
  a control unit including a processor configured to perform the following:
  detecting a control pressure deviation of a pressure in a high-pressure reservoir of the fuel injection system;
  recognizing a balance disturbance between quantity of fuel supplied to the high-pressure reservoir and quantity of fuel taken from the high-pressure reservoir; and
  if a balance disturbance exists, at least one of (i) providing an operational influencing of the fuel injection device, which influencing counteracts the balance disturbance, and (ii) generating a report of the balance disturbance, wherein:
    the operational influencing is effected with the aid of a desired-quantity correction of the injection system, and
    the desired-quantity correction is a reduction of the desired torque.

* * * * *